United States Patent [19]
Snaper

[11] Patent Number: 6,060,198
[45] Date of Patent: May 9, 2000

[54] ELECTROCHEMICAL BATTERY STRUCTURE AND METHOD

[76] Inventor: Alvin A. Snaper, 2800 Cameo Cir., Las Vegas, Nev. 89107

[21] Appl. No.: 09/087,604

[22] Filed: May 29, 1998

[51] Int. Cl.[7] .............................. H01M 4/70; H01M 4/64; H01M 4/72
[52] U.S. Cl. .......................... 429/233; 429/241; 429/237
[58] Field of Search ..................................... 429/233, 234, 429/235, 241, 243, 244, 3, 4, 7, 9

[56] References Cited

U.S. PATENT DOCUMENTS

| | | | |
|---|---|---|---|
| 5,326,656 | 7/1994 | Meadows et al. | 429/178 |
| 5,352,544 | 10/1994 | Kumar et al. | 429/4 |
| 5,508,131 | 4/1996 | Bowen et al. | 429/210 |
| 5,589,301 | 12/1996 | Edgington et al. | 429/234 |
| 5,601,953 | 2/1997 | Schenk | 429/241 |
| 5,718,987 | 2/1998 | Misra et al. | 429/160 |

*Primary Examiner*—Maria Nuzzolillo
*Assistant Examiner*—Angela J. Martin
*Attorney, Agent, or Firm*—Doanld D. Mon

[57] ABSTRACT

A battery plate and a battery including the plate, the plate being a rigid reticulated conductive metal structure comprised of rigid elongated tendrils many of which meet in continuous intersections (apexes) of the tendrils to form dodecahedrons which form a conductive structure with pores and volumes to receive electrolyte. If desired a coating of battery materials can be adhered to the structure, still leaving open pores and volumes.

10 Claims, 2 Drawing Sheets

ELECTROCHEMICAL BATTERY STRUCTURE AND METHOD

FIELD OF THE INVENTION

An electrochemical battery having pairs of oppositely charged plates and an intervening electrolyte, the plates being rigid bodies with an infra supported rigidly linked elongated tendril structure to increase the surface area of the plates and to enable contact of the electrolyte and the plates within the boundary of the plates. The plates may be subjected to ultrasonic vibration to reduce metal ion/electron transport stagnation at the interface between the plates and the electrolyte. A non-conducting gel which becomes conductive when ultrasonically agitated may be used.

BACKGROUND OF THE INVENTION

Electrochemical batteries classically include pairs of oppositely charged plates (positive and negative), and an intervening electrolyte to convey ions from one plate to the other when the circuit through the battery is completed. This is a very well developed and active art, but after decades of steady effort and improvement, batteries still remain a principal impediment to the employment of electricity as a motive force in many practical applications.

A battery's capacity to deliver electrical current is a straight-line function of the surface area of its plates which is contacted by the electrolyte. A flat plate constitutes a lower limit, which is frequently improved by sculpting its surface. Waffle shapes are well-known, for example. There is a physical limitation to what can be done to "open-up" the surface of the plates, because these plates must resist substantial mechanical stringencies such as vibration and acceleration, and must be strongly supported at their edges. Thus, plates which are rendered delicate by casting or molding them into shapes which have thin sections are not a viable solution to increase the surface area of the plates. Also, such plates are subject to erosion and loss of material, thereby further reducing the strength of the plate over the life of the battery. A tempting solution is to use a woven screen for a plate. However, screens can be bent, usually on two axes. Especially after significant erosion they do not have sufficient structural strength. A battery is destroyed if a screen or plate collapses or contacts a neighbor.

Despite the inherent potential structural disadvantages, it is a valid objective to attempt to increase the area exposed to the electrolyte by giving access to interior regions of a plate. Otherwise the entire interior of the plate serves as no more than an electrical conductor and support for the surface of the plate. Holes through the plate can in fact increase surface area by the difference between their area removed from the surface and the added area of their walls. There is an obvious limitation to this approach.

A benefit in addition to increased surface area which could be obtained with an open-structured plate is the storage of electrolyte within the envelope of the plate. In turn, for a given amount of electrolyte volume, the gross volume of the battery can be reduced by the amount which is stored in the plates, rather than in the spacing between plates. Evidently the problem is one of increasing the surface area of the plates without compromising their strength.

This invention provides a rigid plate structure with substantial open passages formed by an assembly of rigid elongated links rigidly joined together at intersections to form a continuous monolithic body braced in all directions to resist compression, elongation, bending, vibration and acceleration. The links provide this structural rigidity, and also act as boundaries of (or impediments in) the passages, and form a substantial area exposed to the electrolyte. Such a structure is frequently called "reticulated". When this structure is made of a metal that takes part in the battery reactions, it forms the plate itself. When it is covered by a compound that is involved in the reactions, often applied as a paste, the structure comprises a substrate support, and is thereby only a part of the plate. It establishes the shape of the surface.

The use of the resulting structurally rigid plates has the further advantage that they can be placed closer together because of their rigidity, thereby reducing the size of the battery, and the quantity of electrolyte which is required. At once this increases the power density for both weight and volume of the battery. In addition, a porous non-conductive spacer, preferably with similar geometry, can be placed in abutment with the plates to provide a solid reinforced structure.

Stagnation is another problem faced by all batteries. Because the mechanism of ion transfer requires migration of ions relative to the exposed surfaces, when the electrolyte at its interface with the plate is depleted, replacement by ion migration is slow. In this invention, interface conditions can be improved by ultrasonic vibration of the plates, or of the electrolyte, or of both, which causes physical movement at the interface. This low energy vibration is not effective in solid plates, and is intolerable in very weak plates. However with the structure of the plates according to this invention, ultrasonic vibration of the plates or of the electrolyte (or of both) at the interface is practical and effective.

The use of ultrasonic vibration enables the use of a very convenient gelled electrolyte. Some such gels are poorly conductive when jelled, but when subjected to such energy they liquify and become more conductive. Their jelled condition makes them more stable when handled. By utilizing a plate which can be responsive to such vibration without damage, then the advantages of such an electrolyte become available, a particularly useful feature as to the electrolyte which is housed with the passages in the plates.

BRIEF DESCRIPTION OF THE INVENTION

A battery according to this invention includes pairs of conductive plates (electrodes) which are oppositely charged during charging and discharging of the battery. At least the surface regions of the plates are conductive and are made of materials respective to the type of battery. For many batteries, what will be the substrate in some systems is the entire plate. In others, it will be a frame-like substrate that is coated or otherwise surfaced with a second material which is respective to the type of battery. What is important is the configuration of the plate, whatever its composition.

According to this invention, the plate (or substrate) comprises a rigid body composed of conductive metallic infra-supported rigidly linked-together elongated tendrils. These tendrils form a rigid structure and have surfaces between which passages extend in all directions through the plate from surface to surface of the plate.

According to an optional feature of the invention, one or both of these structures may be surfaced with other material to form a plate with a surface composition respective to the type of battery.

According to an optional feature of the invention, ultrasonic means may be coupled to the plates or to the electrolyte, which means may be powered by the battery itself.

According to another optional feature of the invention, an electrolyte level sensor may be included to sense the electrolyte level.

According to still another optional feature of the invention, a porous spacer having a similar internal configuration, but made of non-conductive material, may be placed between the plates.

The above and other features of this invention will be fully understood from the following detailed description and the accompanying drawings, in which:

DETAILED DESCRIPTION OF THE DRAWINGS

Figure 1:
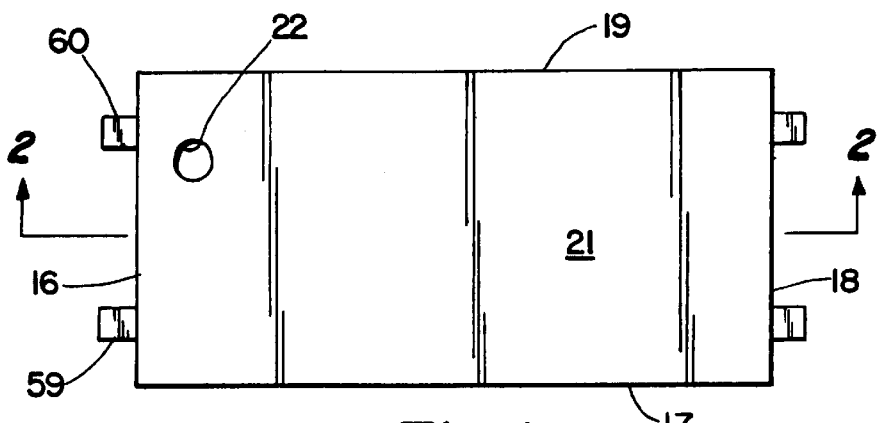
FIG. 1 is a top view of a battery according to this invention.
Figure 2:
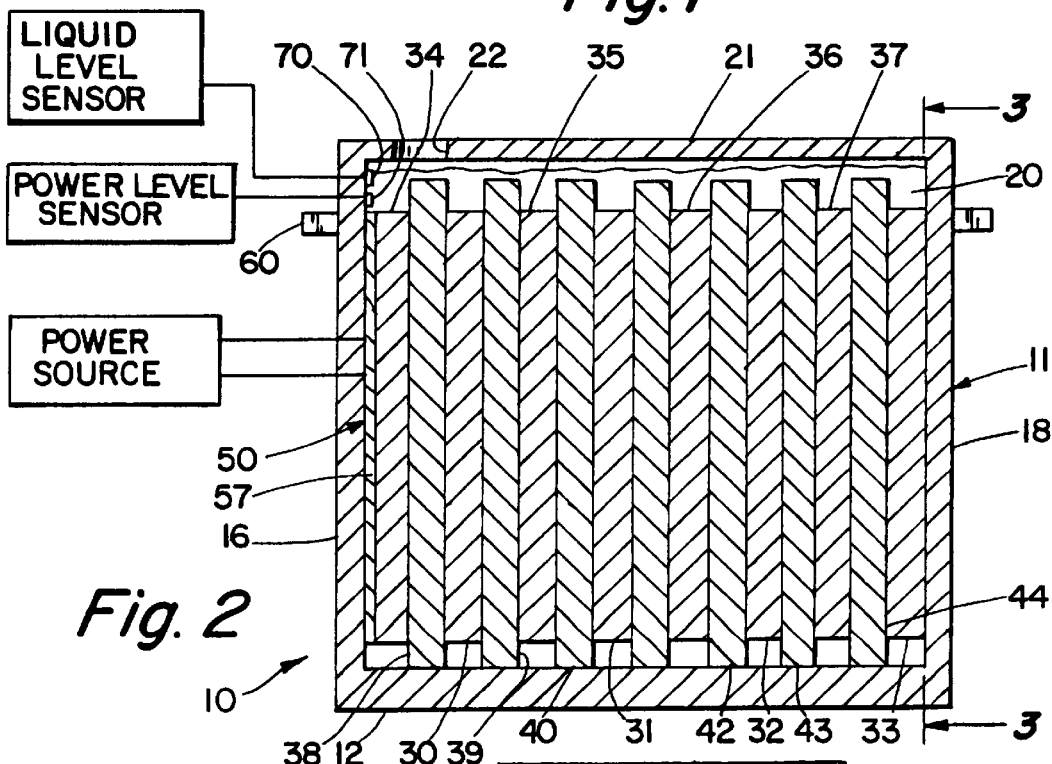
FIG. 2 is a cross-section taken at line 2—2 in FIG. 1.
Figure 3:
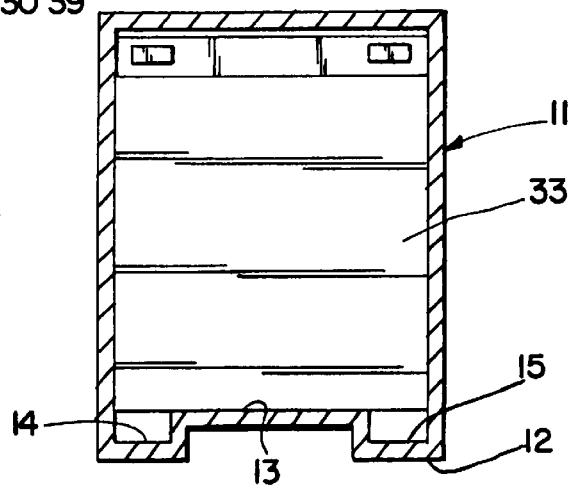
FIG. 3 is a cross-section taken at line 3—3 in FIG. 2.

FIG. 1 shows a battery 10, whose construction can be multiplied, or which can be connected together with other similar batteries in any desired configuration to provide desired voltage and capacity.

A case 11 is formed of material resistant to the chemicals used in the battery, and made strong enough to resist the vibration and impact forces to which it will be exposed. While other configurations may be used instead, the illustrated shape enables very effective use of the unique features of this invention.

In the drawings, the battery is shown as comprising a plurality of cells, each cell comprising a positive and negative plate, with a separator between them. An electrolyte floods the region between the plates. In the following disclosures, the cells are conductively connected in parallel, all positive plates being connect to one another, and all negative plates being conductively connected together. In such a circuit, the voltage between the positive and negative terminals will be that of the individual cells, while the current capacity will be that of their sum.

It is equally possible to connect the cell in series, from positive to negative to positive, and so on. In this arrangement the voltage will be the sum of the voltages of the individual cells. Other arrangements can combine parallel and series connections. Accordingly it is to be understood that the circuit arrangement of the battery itself is not a limitation on the invention, and that this invention comprehends all arrangements of the cells disclosed herein.

The case includes a bottom 12 with a central raised base 13 with a channel 14, 15 on each side of it. Sidewalls 16, 17, 18, 19 rise from the bottom to form a battery chamber 20. A lid 21 closes the chamber at the top. Fill ports 22 provide means to add electrolyte to the battery, and if necessary, to provide a vent for the cells.

Figure 4:
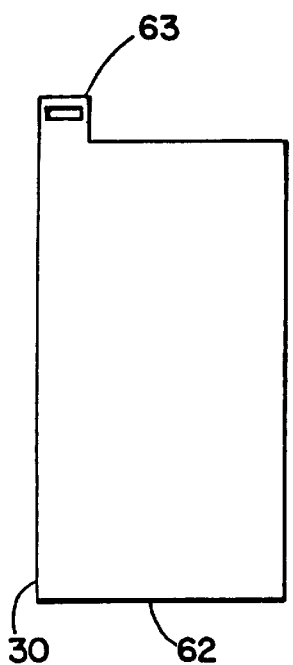
FIG. 4 is a side view showing the boundaries of one of the plates in FIG. 2.
Figure 5:
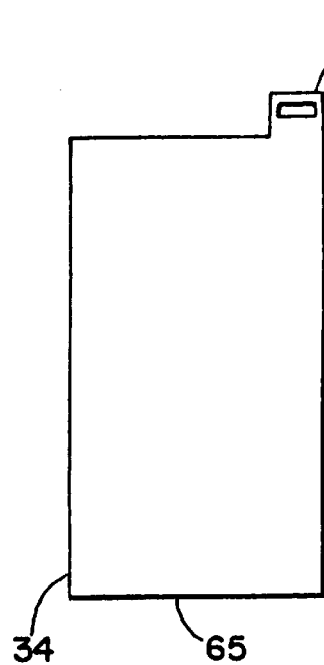
FIG. 5 is a side view showing the boundaries of another of the plates in FIG. 2.

The battery includes a progression of four positive plates 30, 31, 32, 33 (FIG. 4), and four negative plates 34, 35, 36, 37 (FIG. 5). The negative and positive plates are interleaved, and there is a separator 38, 39, 40, 41, 42, 43 and 44 (FIG. 6) between adjacent plates. These plates and separators are preferably brought into abutment to form a progression of four cells in a solid pack which may be self-supporting inside the walls, or which may be fitted to retention means in or on the case.

A transducer 50 is conveniently provided as a flat sheet 51 that bears against negative plate 34 to cause the entire group of plates and separators to vibrate ultrasonically, as will be described below. The transducer's thickness is about that of a sheet of paper. If a transducer for each cell is desired, it will be placed against the outer surface of one of the plates of its cell where it will not impede the migration of ions from one plate to the other.

Figure 6:
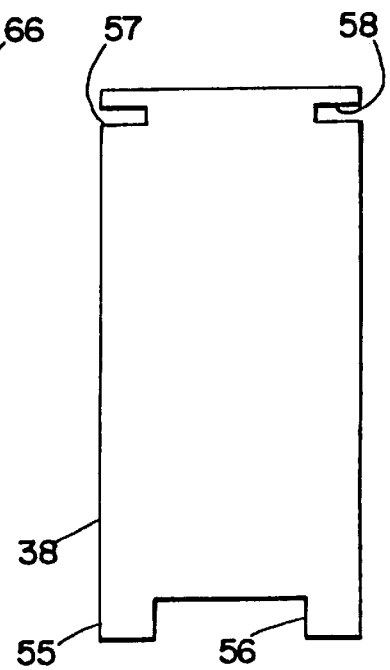
FIG. 6 is a side view showing the boundaries of the separators in FIG. 2.

In FIG. 6, the outline of separator 38 is shown in detail, which is typical of all of the separators. It is a flat plate with two legs 55, 56 that rest against the bottom of the case in channels 14 and 15. A central bottom edge rests on base 13. Notches 57, 58 pass respective positive intercell connector 59 and negative intercell connector 60 when the cells are connected in parallel.

In FIG. 4, positive plate 30 is shown, which is typical of all of the positive plates. Its bottom edge 62 rests on base 13. A tongue 63 engages the positive connector 59 in the parallel connection.

In FIG. 5, negative plate 34 is shown, which is typical of all of the negative plates. Its bottom edge 65 rests on base 13. A tongue 66 engages the negative connector 60 in the parallel connection. It will be observed that channels 14 and 15 comprise wells in which debris from the plates can collect.

A liquid level indicator 70 is mounted to side wall 16 at a desired level to give indication of low electrolyte.

A power level sensor 71 is also mounted to sidewall 16 to sense the amount of available power in the battery. Snaper U.S. Pat. No. 4,107,997 shows a suitable circuitry for showing power available. It is incorporated herein in its entirety for that purpose.

The foregoing structure provides the venue to accomplish the objectives of this invention. Clearly, other plate, case, and circuit configurations may be used instead, all within the scope of this invention.

Figure 7:
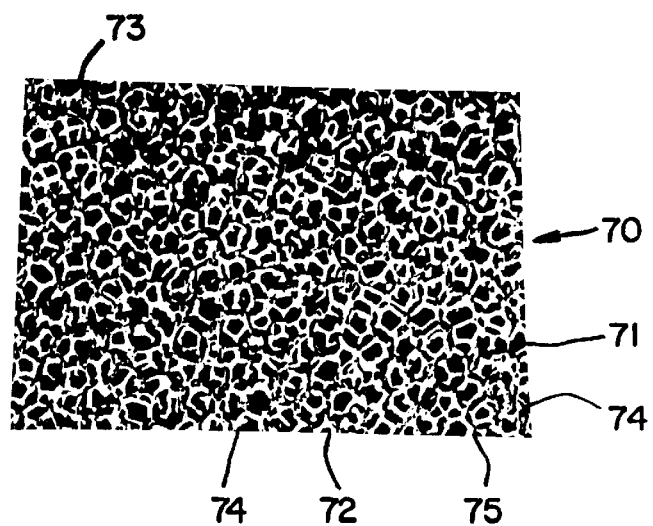
FIG. 7 is a photograph showing the three dimensional construction of the plates of FIGS. 4 and 5.

The presently preferred material of construction for the plates is shown in FIG. 7. This photograph shows the surface and some of the underlying structure in a ¼" thick flat plate of this material. Plate 70 may be used for either or both of the positive and negative plates. It can be made of a conductive metal suitable for the battery environment and its reactions. When used merely as a coated substrate, its metal will not take part in the reaction. Then it will have been coated with a substance, perhaps an oxide or even a different metal. Its purpose then is to act as a structural substrate. Accordingly, the structure to be described below is intended to include both a bare-metal and a coated-metal plate.

The essential features of this plate are rigidity, openness, and increased surface area compared to a flat plate of similar dimensions. The illustrated plate is a sheet 71 of reticulated metal. In particular it is formed of a large number of interlinked dodecahedrons. These are very rigid structures, formed with twelve identical pentagonal faces. These are repeated throughout the plate. An examination of FIG. 7 shows open pentagonal faces such as faces 72 and 73, bounded by tendrils 74. Most of the tendrils form an edge of a respective pentagon, and each rigidly interconnects with two other tendrils at an apex 75 to form the dodecahedron. However, where the dodecahedrons do not nest, there are linkages between the structures which continue the rigid formation of the entire body. The result is a rigid porous body with cells open to flow throughout the body, so that the entire surface of the tendrils is exposed to electrolyte. The pore size, and the size and length of the tendrils (which tend to be rounded in cross section), are determined in the course of the manufacture.

A useful aluminum reticulated plate is sold by ERG Corporation. Its product No. RVA is suitable for battery use, having a pore volume of up to 96% of the body envelope.

Although spacers are not necessary if the plates are suitably supported at their edges, it is advantageous to provide them between the plates in order to make a more unitary battery. A reticulated structure is also useful for such spacers. Its appearance will be the same as shown for the plates in FIG. 7. The spacers must be made of non-conductive material. Suitable products for spacers are sold as a reticulated foam. The porosity will be selected as a compromise between providing optimum storage volume for the electrolyte and structural support for the plates.

A polyurethane foam is ideal for battery applications, and pore and tendril sizes similar to those of the plate can successfully be used. They are sold by Crest Foam Industries, Inc. of Moonachie, N.J. as their Filter Crest reticulated polyurethane foam.

Transducer 50 is preferably a flat-sheet piezo electric film. It may be immersed in the electrolyte to agitate it, or be placed in contact with one of the plates in a stack to agitate all plates, or be applied individually to any or all of the plates and spacers. Its purpose is to keep the surfaces of the plates "alive" in the sense that mobility at the interface will eliminate or at least reduce ion depletion, and make the surface and interface with the electrolyte more available for reaction.

The ultrasonic frequency to be selected and its intensity are functions of the structural characteristics of the entire battery. Usually the frequency range will be between about 20 KHz and about 120 KHz. The required wattage is surprisingly low. Typically between about 10 to about 20 watts output of vibrational energy will be sufficient.

A suitable transducer for this purpose is sold by AMP Incorporated, Piezo Film Sensors Division of Valley Forge, Pa., for example its DT Series Elements Nos. 1-1003702-4 and 3-1003702-4.

Because this energy is required only while the battery is in use, while being charged or discharged, the energizing current may be obtained directly from the battery itself with circuit means that conduct to the transducer only while the battery is active. Such circuitry will be evident to a person skilled in the art.

A level sensing element of any suitable type may be used, including conventional liquidometers and wetness-sensitive monitors. Snaper U.S. Pat. No. 4,595,916 shows one such example, and is incorporated herein in its entirety for that purpose.

Electrolytes of any suitable type may be used. For many applications, such as lead-acid types, it will be sulfuric acid. In nickel-iron types, it will be an alkaline electrolyte. Other types of electrolytes may be gelled and less-conductive while in the gelled condition. Vibration can agitate many such gels, and at the same time liquify them and make them more conductive. Such gels, generally polymer-based are well-known in the battery art.

Examples of battery types in which these plates are useful are the Edison-Lalande (copper oxide-zinc) Daniell (zinc-copper) nickel-cadmium storage battery (cadmium-nickelous hydroxide, nickelic hydroxide, and lead-acid (lead-lead sulfate/peroxide) types. In all of these, the substrate or the substrate and its coating will have the configuration and characteristics of the reticulated structure. In some examples it may be that only one of the plates of each cell would be reticulated, and the other would have a different shape. Cells with only one reticulated plate are contemplated in this invention.

This invention is not to be limited by the embodiment shown in the drawings and described in the description, which is given by way of example and not of limitation, but only in accordance with the scope of the appended claims.

I claim:

1. A plate for use as an electrode in an electrochemical battery in which it is submerged in an electrolyte, said plate comprising a rigid reticulated metal structure comprised of an electrically conductive metal formed of rigid elongated tendrils which have a dimension of thickness and length and a surface area, said tendrils being continuously joined to one another at apexes of three tendrils to form a rigid structure containing a plurality of pentagonally-faced dodecahedrons, said dodecahedrons being joined to one another, all to form said unitary structure, said plate having a pair of parallel, spaced apart faces bounded by edges to define a plate envelope having a volume, the dimensions and number of said tendrils being selected to provide interconnected open pores said structure having a volume open to flow between the faces, providing a reservoir for electrolyte to be stored and to contact the tendrils.

2. A battery cell comprising a positive plate, a negative plate, and an electrolyte in contact with both plates, at least one of said plates comprising a rigid reticulated metal structure comprised of an electrically conductive metal formed of rigid elongated tendrils which have a dimension of thickness and length and a surface area, said tendrils being continuously joined to one another at apexes of three tendrils to form a rigid structure containing a plurality of pentagonally-faced dodecahedrons, said dodecahedrons being joined to one another, all to form said unitary structure, said plate having a pair of parallel, spaced apart faces bounded by edges to define a plate envelope having a volume, the dimensions and number of said tendrils being selected to provide interconnected open pores inside said structure having a volume open to flow between the faces, providing a reservoir for electrolyte to be stored and to contact the tendrils.

3. A battery cell according to claim 2 in which a spacer is placed between and in contact with a surface of each of said plates, said spacer comprising a reticulated structure of non-conductive material.

4. A battery cell according to claim 3 in which said spacer is reticulated organic plastic foam.

5. A battery cell according to claim 2 in which both of said plates are comprised of said reticulated metal structure.

6. A battery cell according to claim 5 in which a spacer is placed between and in contact with a surface of each of said plates, said spacer comprising a reticulated structure of non-conductive material.

7. A battery cell according to claim 6 in which said spacer is reticulated organic plastic foam.

8. In a battery according to claim 2, the improvement comprising a transducer in contact with at least one of said plates adapted to apply ultrasonic energy to said plate at a frequency between about 20 KHz and 120 KHz.

9. A battery according to claim 8 in which a circuit between said plates causes said transducer to generate said energy while an electrical current flows between said plates.

10. A battery according to claim 2 in which a coating of battery-active material is adherent to and covers the rigid structure, still leaving pores and volumes open to flow between the faces.

* * * * *